United States Patent [19]

Niwa

[11] Patent Number: 4,685,724
[45] Date of Patent: Aug. 11, 1987

[54] SLIDING ROOF FOR VEHICLES

[75] Inventor: Toshiaki Niwa, Saitama, Japan

[73] Assignee: Honda Giken Kogyo Kabushiki Kaisha, Tokyo, Japan

[21] Appl. No.: 827,875

[22] Filed: Feb. 10, 1986

Related U.S. Application Data

[62] Division of Ser. No. 510,336, Jul. 1, 1983, abandoned.

[30] Foreign Application Priority Data

Jul. 2, 1982 [JP] Japan ................. 57-115271

[51] Int. Cl.$^4$ .................. B60J 7/047; B60J 7/057
[52] U.S. Cl. .................. 296/216; 296/220; 296/223
[58] Field of Search ................ 296/216, 220, 221–223

[56] References Cited

U.S. PATENT DOCUMENTS 4,407,541 10/1983 Boots .................. 296/216
4,463,983 8/1984 Hellriegel .................. 296/216

FOREIGN PATENT DOCUMENTS 2068304 8/1981 United Kingdom .................. 296/216

*Primary Examiner*—Robert B. Reeves
*Assistant Examiner*—Dennis H. Pedder
*Attorney, Agent, or Firm*—Irving M. Weiner; Joseph P. Carrier; Pamela S. Burt

[57] ABSTRACT

A sliding roof in which a panel for closing and opening a roof opening is supported with front and rear stays slidable through guides. The front stay is slidable along a first guide provided on a roof frame, and the rear stay is interposed between the first guide and a second guide provided on the underside surface of the panel, so as to be slidable relative to at least either guide. At least one of the front stay, the rear stay and the first guide are formed such that, as the front stay approaches the rear stay with the panel caused to move rearwardly of the vehicle body, a support point of the front stay supporting the panel is raised to be higher relative to a support point of the rear stay supporting the panel. Also, the front stay is arranged to be located transversely adjacent the rear stay when the sliding roof panel has been moved completely rearwardly.

18 Claims, 10 Drawing Figures

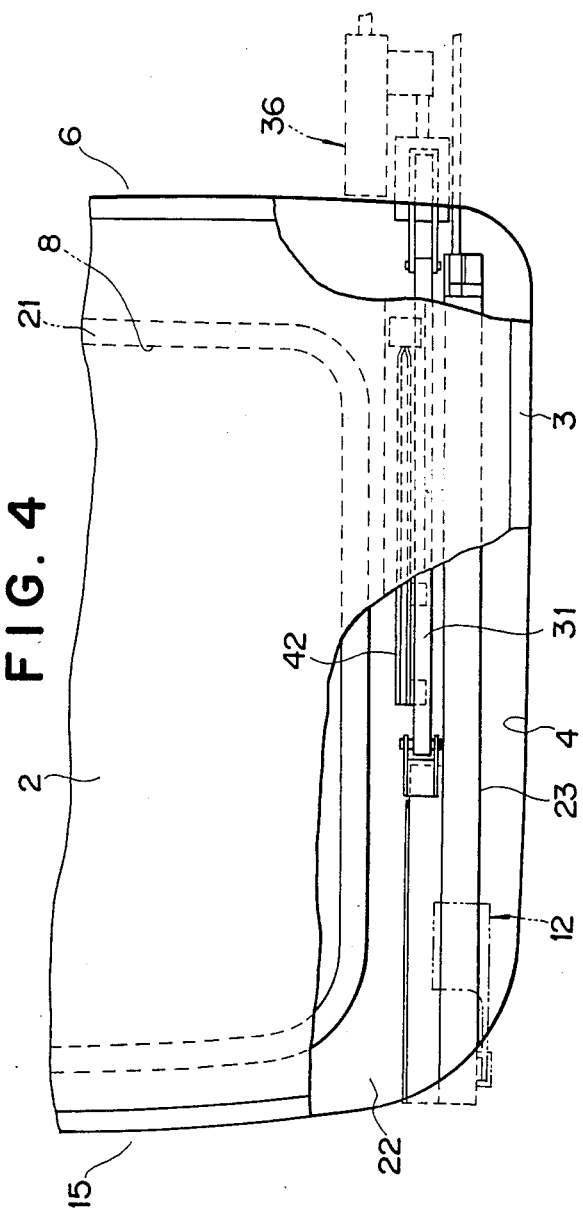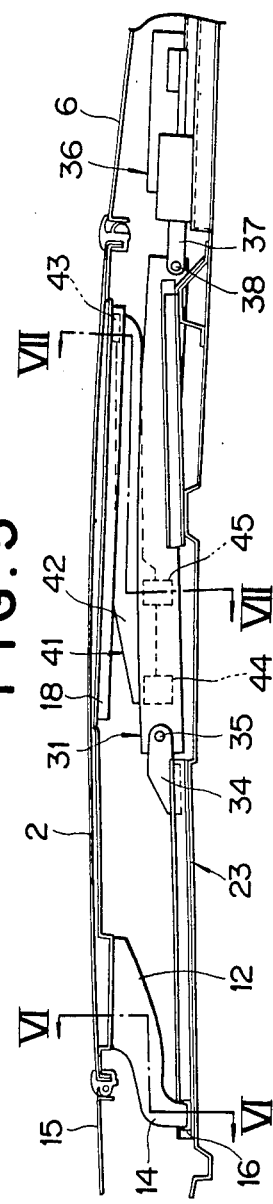

SLIDING ROOF FOR VEHICLES

This is a division of application Ser. No. 510,336 filed July 1, 1983, now abandoned.

BACKGROUND OF THE INVENTION

1. Field of the Invention

The present invention relates generally to a sliding roof for vehicles. Particularly, the invention relates to a sliding roof for vehicles of the type in which a slidable panel slides outwardly and rearwardly of a roof opening.

2. Description of Relevant Art

As one of the sliding roofs for vehicles, there has been known in the art an externally sliding roof which is disclosed in GB No. 2,068,304. The externally sliding roof is provided with: an opening formed in a body roof; a panel adapted to open and close the opening; and a guide for guiding the opening and closing movement of the panel on the roof so that the panel is slid above the roof through said guide to open the opening.

In that sliding roof of the prior art, however, the members for supporting the panel slidably relative to the roof opening, i.e., front stays and a screw telescope are arranged in alignment with each other with respect to the moving direction of the roof panel. As a result, the maximum stroke of the rearward movement of the roof panel terminates in a position, where the aforementioned supporting members abut against each other, thereby causing a disadvantage in that the length of the opening when the panel is opened cannot be retained at a large value.

SUMMARY OF THE INVENTION

According to the present invention, there is provided a sliding roof for vehicles, comprising an opening formed in a body roof; a panel adapted to open and close the opening; and a guide for guiding the opening and closing movement of the panel above the roof. Said guide is constructed of main guide rails and a sub-guide rail juxtaposed to each other.

Accordingly, an object of the present invention is to provide a sliding roof for vehicles, which is enabled to retain the longitudinally moving stroke of the panel at a large value and to provide a wide opening when the panel is opened.

The above and further features and objects of the present invention will become more fully apparent from the following detailed description of the preferred embodiments of the invention when the same is read in conjunction with the accompanying drawings.

BRIEF DESCRIPTION OF THE ACCOMPANYING DRAWINGS

FIG. 4 is a partial plan view of the sliding roof in according with a first embodiment of the invention, with the slidable panel partially broken away.

FIG. 5 is a sectional view of the embodiment of FIG. 4, with the slidable panel closed.

DETAILED DESCRIPTION OF THE INVENTION

Figure 3:
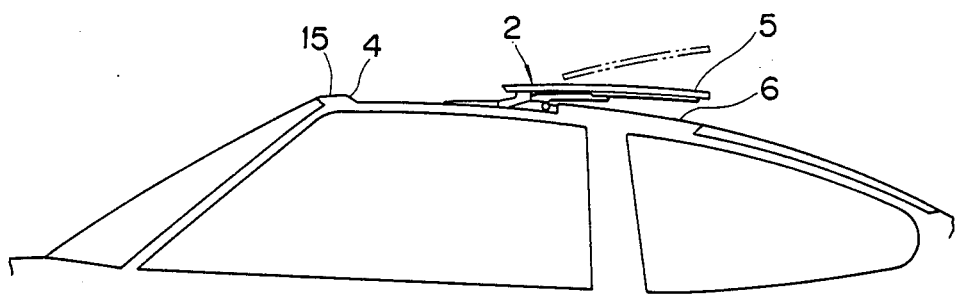
FIG. 3 is a view similar to FIG. 1, with the slidable panel moved to the rear stroke end thereof.

Referring first to FIGS. 1 to 4, designated by reference numeral 1 is a roof of a vehicle. The roof 1 is formed therethrough with an opening 4 closable with a slidable panel 2 which has along the peripheral edge thereof a seal member 3 fitted thereon. To open the roof opening 4, the panel 2 is raised at its rear part 5 (FIG. 2) and moved toward the rearmost position of a rear fixed roof 6 of the vehicle (FIG. 3). At this time, an opening 8 (FIG. 4) formed through a lining 7 of the roof 1 is concurrently opened, permitting a passenger area of the vehicle to communicate with the open air through the openings 4 and 8.

Figure 6:
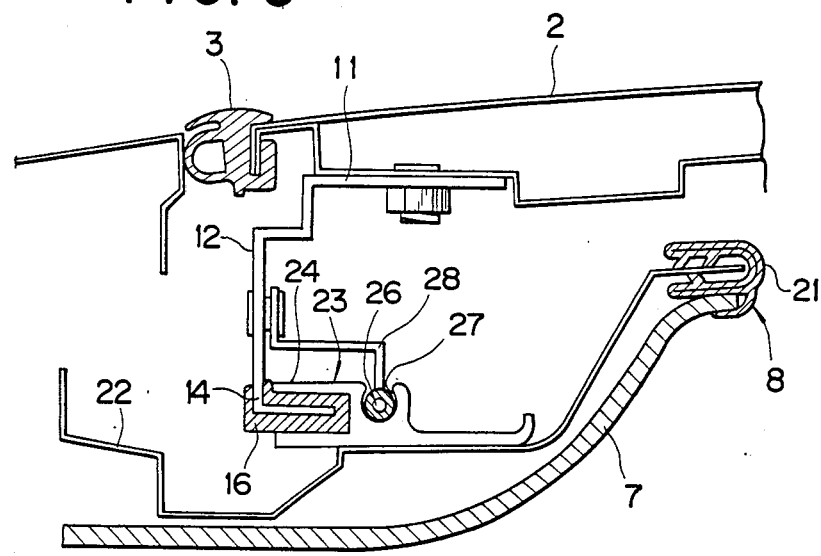
FIG. 6 is a sectional view taken along line VI—VI of FIG. 5.

Referring now to FIGS. 5 and 6, on both sides of the front end of the underside surface of the panel 2, there is provided either a pair of front stays 12 depending downwardly therefrom while having their flanged upper ends 11 secured to the panel 2 and their lower ends 14 provided with either of a pair of sliders 16. Each front stay 12 has a form extending, between the flanged upper end 11 to the lower end 14, forwardly relative to the body of the vehicle and projecting, at the lower end 14, forwardly of the front part of the panel 2 so that, while the panel 2 is in its closed position, the lower end 14 is disposed under a front fixed roof 15 of the vehicle.

Figure 7:
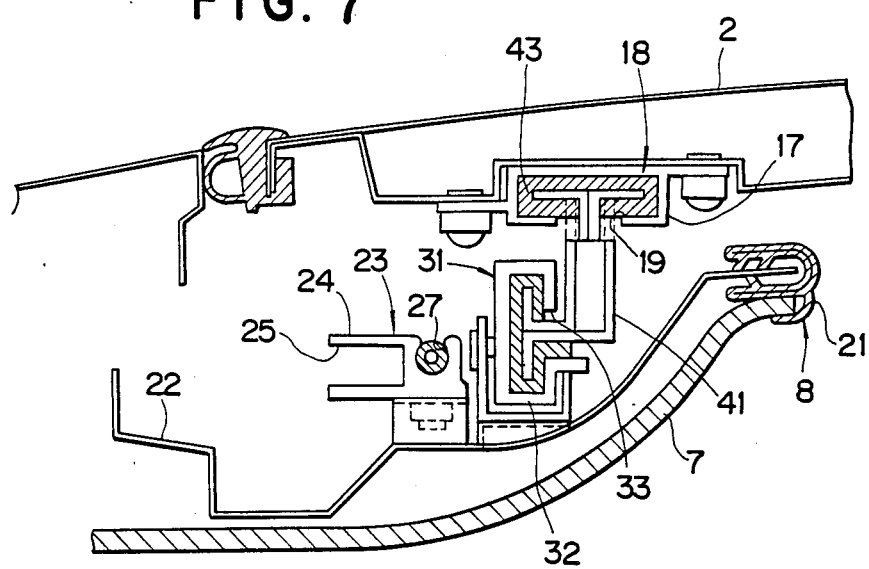
FIG. 7 is a sectional view taken along line VII—VII of FIG. 5.

As shown in FIGS. 5 and 7, the panel 2 is provided on the underside surface thereof, along its portion extending rearwardly from the intermediate part thereof, with a pair of sub-guide rails 18 disposed respectively on both sides thereof, the sub-guide rails 18 being each formed with a guide slot 19 opened downwardly.

The opening 8 in the roof lining 7 is provided around the peripheral edge thereof with a trim member 21 fitted thereon and, over the roof lining 7, there are disposed a pair of sheet-like frame members 22 having their inner ends held by the trim member 21, the frame members 22 being disposed under respective sides of the panel 2.

On the frame members 22, there is fixed either of a pair of main guide rails 23 extending in a straight manner from the front part of the roof opening 4 to the rear part thereof. Each main guide rail 23 has a guide portion 24 shaped in its section in the form of a channel defining a groove 25 directed transversely outwardly of the vehicle body and is extended at the front end part thereof to underlie the front fixed roof 15, while being forwardly inclined as a whole with the rear part thereof positioned at a higher level than the front part thereof. The guide portion 24 of each main guide rail 23 is formed in its transversely inward portion with a guide slot 27 for slidably guiding a drive cable 26 which is connected through a fitting 28 to the front stay 12, as shown in FIG. 6.

Figure 8:
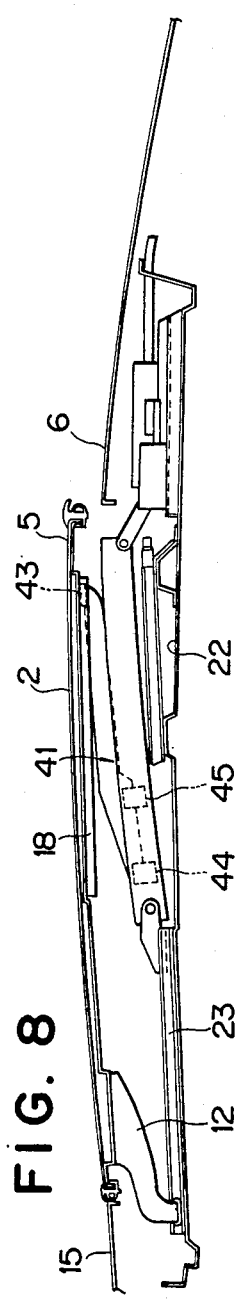
FIG. 8 is a sectional view similar to FIG. 5, with the slidable panel raised at the rear part thereof.
Figure 9:
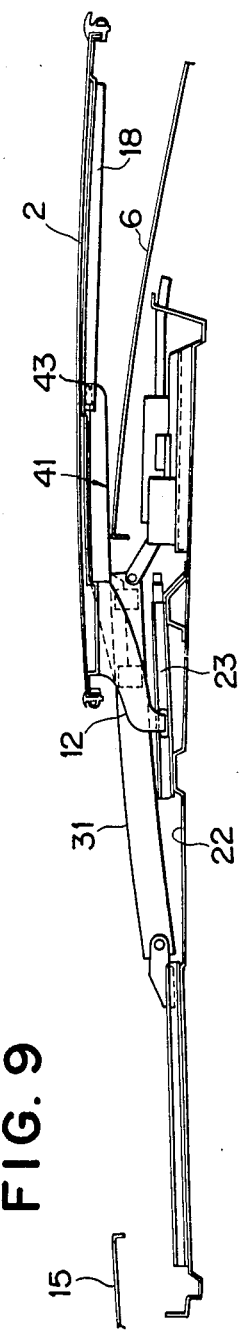
FIG. 9 is a sectional view similar to FIGS. 5 and 8, with the slidable panel moved to the rear stroke end thereof.

In the guide portion 24 of each main guide rail 23, there is fitted a slider 16 which is adapted to be slidable therealong and rotatable for a predetermined angle range to thereby cause the panel 2 to be tilted up or raised at the rear part 5. As shown in FIGS. 8 and 9, the panel 2 is adapted to be slidable with the front stay 12 over the rear fixed roof 6 when the drive cable 26 is moved rearwardly from the state thereof as the panel 2 is raised at the rear part 5. In the fully closed state of the panel 2 shown in FIG. 5, the lower end 14 of the front stay 12 is located under the front fixed roof 15 and the slider 16 is at the front end part of the main guide rail 23, while in a fully opened state thereof shown in FIG. 9 the slider 16 is brought near the rear end part of the main guide rail 23.

On each frame member 22, at the transversely inward side of the guide portion 24 of the main guide rail 23, there is mounted a sub-guide rail 31 at the side of the frame member 22 corresponding to the sub-guide rail 18 at the side of the panel 2, the sub-guide rail 31 extending between a substantially intermediate part thereof.

The frame side sub-guide rail 31 has a guide portion 32 formed therein with a slot 33 opened inwardly of the vehicle body and, as shown in FIG. 5, is pivotably connected at the front end part thereof to a support shaft 35, which is supported by a hinge arm 34 secured to the substantially intermediate part of the frame member 22 at either transverse side thereof, and at the rear end part thereof through a support shaft 38 to a drive lever 37 of a tilt-up mechanism 36, which is disposed under the rear fixed roof 6 at either transverse side thereof. The aforementioned main guide rails 23 and frame side sub-guide rails 31 are juxtaposed to each other, as viewed in a top plan in FIG. 4.

Figure 10:
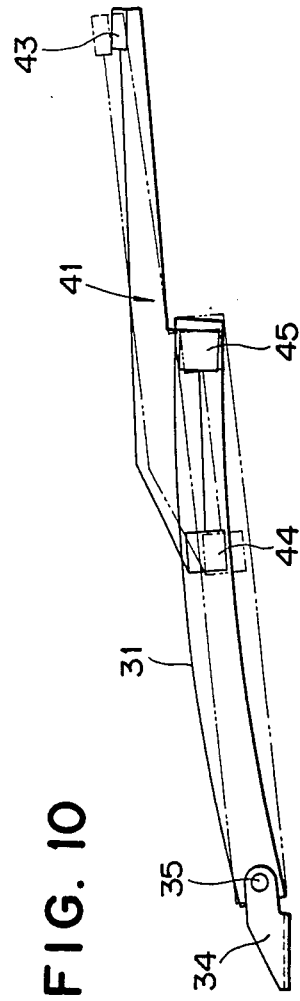
FIG. 10 is an explicative view of the functional relation between a rear slide stay and a guide rail therefor.

As shown in FIG. 10, the sub-guide rail 31 is arcuately formed to be slightly convexed upwardly, and adapted to be vertically swingable about the shaft 35, following the drive lever 37, when lever 37 is vertically rotated with tilt-up mechanism 36.

Between the panel side sub-guide rail 18 and the frame side sub-guide rail 31, there is slidably fitted a rear stay 41 extending longitudinally of the vehicle body, the rear stay 41 being provided on the upper side of the rear part thereof with a slider 43 slidably fitted in a guide portion 17 of the panel side sub-guide rail 18 and on the lower side of the front part thereof with a pair of sliders 44, 45 spaced from each other longitudinally of the vehicle body and both slidably fitted in the guide portion 32 of the frame side sub-guide rail 31, while the vertical distance between the upper slider 43 and the lower sliders 44, 45, that is the height of the rear stay 41, is predetermined to be smaller than that between the slider 16 and the panel 2, that is, the height of the front stay 12.

In the fully closed state of the panel 2 shown in FIG. 5, the upper slider 43 is located in the rear end part of the panel side sub-guide rail 18 and the lower front slider 44 is located in the front end part of the frame side sub-guide rail 31. In the fully opened state of the panel 2 shown in FIG. 9, in which the rear stay 41 is brought over the rear fixed roof 6, the upper slider 43 is positioned in the front end part of the panel side sub-guide rail 18 and the lower rear slider 45 is positioned in the rear end part of the frame side sub-guide rail 31.

In the above arrangement, the sliders 43, 44, 45 and the guide portions 17, 32 are so arranged that, with the longitudinal movement of the panel 2, the rear stay 41 also moves longitudinally of the vehicle body. Namely, the rearward movement of the rear stay 41 may be such that at first only the panel 2 moves rearwardly from the state shown in FIG. 8 and in due course the panel side sub-guide rail 18 engages at the front end part thereof with the upper slider 43 before the rear stay 41 starts moving rearwardly integrally with the panel 2, or such that the rear stay 41 moves rearwardly integrally with the panel 2 from the initial point and in due course the lower rear slider 45 engages with the rear end part of the frame side sub-guide rail 31 before the upper slider 43 slides along the panel side sub-guide rail 18, thereby permitting only the panel 2 to move rearwardly. Moreover, the rear stay 41 may move rearwardly, sequentially following the rearward movement of the panel 2.

There will be described hereinbelow the function and effect of the sliding roof in accordance with the first embodiment of the invention.

Figure 1:
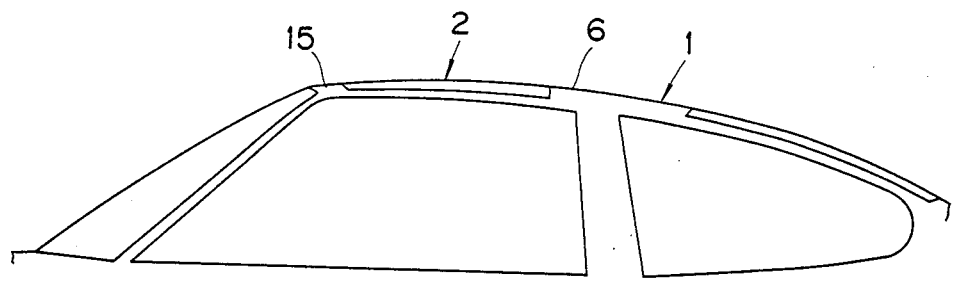
FIG. 1 is a schematic side view of an upper portion of a vehicle provided with a sliding roof according to the invention, with a slidable panel closed.
Figure 2:
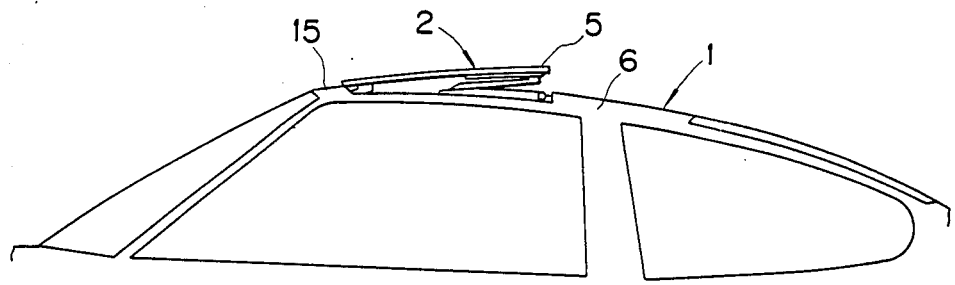
FIG. 2 is a view similar to FIG. 1, with the slidable panel raised at the rear part thereof.

First of all, to fully open the panel 2, when from the fully closed state of the panel 2 shown in FIGS. 1 and 5 the drive lever 37 is driven to turn upwardly with the tilt-up mechanism 36, the frame side sub-guide rail 31 will swing upwardly about the suppot shaft 35 as a fulcrum, thereby causing the rear part 5 of the panel 2 to be tilted up or raised with the rear stay 41, whereas the tilt-up action of the rear part 5 of the panel 2 is rendered smooth with the slider 16 fixed to the front stay 12, which slider 16 is fitted in the guide portion 24 of the main guide rail 23 so as to be rotatable for the predetermined angle range as mentioned hereinabove.

Then, when a cable actuator (not shown) is operated to have the drive cable 26 move rearwardly, the rearward movement of the drive cable 26 will be transmitted through the front stay 12 to the panel 2, thereby causing the slider 16 fixed to the front stay 12, the slider 43 fixed to the rear part of the rear stay 41 and the sliders 44, 45 fixed to the front part of the rear stay 41 to slide along the guide portion 24 of the main guide rail 23, the guide portion 17 of the panel side sub-guide rail 18 and the guide portion 32 of the frame side sub-guide rail 31, respectively, thus carrying the panel 2 toward the rear fixed roof 6.

As the panel 2 moves rearwardly, the rear stay 41 will also move rearwardly, while the rearward movement of the rear stay 41, the height of which is predetermined to be less than the height of the front stay 12 in addition to that the frame side sub-guide rail 31 is arcuately formed to be slightly convexed upwardly, the inclination of the rear stay 41 will be gradually increased. Thus, a support point of the front stay 12 supporting the panel 2 is caused to be raised or rendered higher relative to a supporting point of the rear stay 41 supporting the panel 2, with the result that, as shown in FIGS. 9 and 10, in the fully opened state of the panel 2, the rear stay 41 has a substantially horizontal position, thus rendering the angle the panel 2 makes with the rear fixed roof 6 as small as possible. At this time, the panel 2 is firmly supported at both sides of the front end part thereof with the paired front stays 12 and at both sides of the intermediate part thereof with the paired rear stays 41.

Since the main guide rails 23 and the frame side sub-guide rails 31 are juxtaposed to each other, the front and rear stays 12 and 41 slidably supported on guide rails 23 and 31 are guided during rearward movements thereof to slide sufficiently back and forth without any mutual interference so that the moving distance of the panel 2 can be enlarged. More specifically, with the panel 2 being in its fully open state, as shown in FIG. 9, the front stays 12 are arranged to be located transversely adjacent the rear stays 41, to enlarge the length of the roof opening 4.

On the contrary, to close the roof opening 4, when the cable actuator is operated to have the drive cable 26 move forwardly, the forward movement of the drive cable 26 will be transmitted through the front stay 12 to the panel 2, thereby causing the sliders 16, 43, 44, 45 to permit the panel 2 and the rear stay 41 to move forwardly so that, as shown in FIG. 8, the panel 2 is brought over the roof opening 4.

Then, when the tilt-up mechanism 36 drives the drive lever 37 to turn downwardly, the frame side sub-guide rail 31 will swing downwardly about the support shaft 35 as a fulcrum, thereby putting away the rear stay 41 and the frame side sub-guide rail 31 under the panel 2, to close the roof opening 4 with the panel 2.

In the above first embodiment of the invention, in which the sub-guide rail 31 has an arcuate form convexed upwardly, the distance between the front stay 12 and the rear stay 41 becomes smaller as the panel 2 slides over the rear fixed roof 6. Accordingly, the inclination of the panel 2 relative to the rear fixed roof 6 will be kept small to a considerable degree even in a modified example in which the frame side sub-guide rail 31 may be straight, assuming no more than that the rear stay 41 has its height predetermined to be smaller than the height of the front stay 12.

With respect to such example, a similar effect will be obtainable even in a further modification in which the height of the front stay 12 may be equal to or smaller than that of the rear stay 41, provided that the main guide rail 23 has its fixing position raised as a whole relative to the frame member 22.

As is apparent from the foregoing description, according to the present invention the longitudinal moving distance of the panel is increased to a large value, whereby the effective length of roof opening is also desirably enlarged when the panel is in its open state.

I claim:

1. An apparatus for tilting up a sliding roof panel (2) about a rear edge of a frame (22) defining an opening (4) in a vehicle roof (6, 15) and for moving said sliding roof panel (2) rearwardly above the roof, comprising:
   guide means, including main guides (23) and sub-guides (31), arranged on both sides of said opening; and
   stay means, including front stays (12) and rear stays (41), provided on said sliding roof panel (2);
   said front stays (12) being fixed on both sides of said panel (2) and operatively connected to said main guides (23);
   said rear stays (41) being slidably connected to said sliding roof panel (2) and operatively connected to said sub-guides (31);
   said sub-guides (31) being located adjacent said main guides (23); and
   said front stays (12) are arranged to be located transversely adjacent said rear stays (41) when the sliding roof panel (2) has been moved completely rearwardly.

2. The apparatus of claim 1, wherein: said rear stays (41) are arranged on inner sides of said sub-guides (31) facing said opening (4) and said main guides (23) are arranged on outer sides of said sub-guides (31) remote from said opening (4).

3. The apparatus of claim 1, wherein: said main guides (23) are fixed to said frame (22).

4. The apparatus of claim 2, wherein: said main guides (23) are fixed to said frame (22).

5. The apparatus of claim 3, wherein: front ends of the sub-guides (31) are hinged to said frame (22) and rear ends of said sub-guides (31) are liftable.

6. The apparatus of claim 4, wherein: front ends of the sub-guides (31) are hinged to said frame (22) and rear ends of said sub-guides (31) are liftable.

7. The apparatus of claim 1 wherein: said main guides (23) are rearwardly inclined upwardly.

8. The apparatus of claim 5 wherein: said main guides (23) are rearwardly inclined upwardly.

9. The apparatus of claim 6 wherein: said main guides (23) are rearwardly inclined upwardly.

10. The apparatus of claim 1 wherein: said main guides (23) are straight and said sub-guides (31) are arcuate upwardly.

11. The apparatus of claim 7 wherein: said main guides (23) are straight and said sub-guides (31) are arcuate upwardly.

12. The apparatus of claim 8 wherein: said main guides (23) are straight and said sub-guides (31) are arcuate upwardly.

13. The apparatus of claim 9 wherein: said main guides (23) are straight and said sub-guides (31) are arcuate upwardly.

14. The apparatus of claim 1 wherein: said front stays (12) have a greater height than said rear stays (41).

15. The apparatus of claim 10 wherein: said front stays (12) have a greater height than said rear stays (41).

16. The apparatus of claim 11 wherein: said front stays (12) have a greater height than said rear stays (41).

17. The apparatus of claim 12 wherein: said front stays (12) have a greater height than said rear stays (41).

18. The apparatus of claim 13 wherein: said front stays (12) have a greater height than said rear stays (41).

* * * * *

UNITED STATES PATENT AND TRADEMARK OFFICE
CERTIFICATE OF CORRECTION

PATENT NO. : 4,685,724

DATED : August 11, 1987

INVENTOR(S) : Toshiaki NIWA

It is certified that error appears in the above-identified patent and that said Letters Patent is hereby corrected as shown below:

Column 1, line 65, change "according" to --accordance--.

Column 4, line 19, correct the spelling of --support--.

Signed and Sealed this

Fifth Day of January, 1988

Attest:

DONALD J. QUIGG

Attesting Officer

Commissioner of Patents and Trademarks